United States Patent [19]

Pickles

[11] Patent Number: 4,739,585
[45] Date of Patent: Apr. 26, 1988

[54] AUTOMATIC DECK LID CLOSER FOR AUTOMOTIVE VEHICLES

[75] Inventor: Joseph Pickles, Troy, Mich.

[73] Assignee: Hoover Universal, Inc., Ann Arbor, Mich.

[21] Appl. No.: 934,339

[22] Filed: Nov. 24, 1986

[51] Int. Cl.⁴ ............................................. E05F 15/00
[52] U.S. Cl. ...................................................... 49/280
[58] Field of Search ................ 49/280, 281, 357, 379, 49/394

[56] References Cited

U.S. PATENT DOCUMENTS

| | | | |
|---|---|---|---|
| 2,833,536 | 5/1958 | Joachim et al. | 49/280 X |
| 3,081,078 | 3/1963 | Lohr | 49/280 X |
| 3,343,303 | 9/1967 | Wanlass | 49/280 |
| 4,333,269 | 6/1982 | Bascou | 49/280 |

FOREIGN PATENT DOCUMENTS 701073  1/1965  Canada ................................. 49/280

*Primary Examiner*—Philip C. Kannan
*Attorney, Agent, or Firm*—Harness, Dickey & Pierce

[57] ABSTRACT

Apparatus for automatically closing the deck lid of an automotive vehicle wherein the deck lid is manually moveable between open and closed positions and carries a latch operable to latch the lid closed and release the lid for opening movement. The apparatus of this invention is advantageous because it will not interfere with manual opening and closing of the lid. It includes a drive mechanism connected to the deck lid and operable when actuated from a remote location such as a switch inside the passenger compartment of the vehicle, to move the deck lid downwardly to a nearly closed position. A moveable striker inside the trunk compartment is engageable with the latch in the nearly closed position of the deck and is operable to pull the deck lid downwardly to the closed position. In one embodiment of the invention the deck lid is also automatically opened by reversing the sequence of operation for closing in response to switch actuation to a remote location such as within the passenger compartment of the vehicle.

7 Claims, 5 Drawing Sheets

AUTOMATIC DECK LID CLOSER FOR AUTOMOTIVE VEHICLES

BACKGROUND OF THE INVENTION

Remote control of the deck lid in an automotive vehicle has long been desired for purposes of convenience and security. U.S. Pat. Nos. 3,081,078 and 3,113,447 disclose remotely actuated deck lock mechanisms. However, these remotely actuated mechanisms do not enable normal opening and closing of the deck lid by use of the usual key for releasing the latch.

It is an object of this invention, therefore, to provide an improved apparatus for automatically closing the deck lid in an automotive vehicle.

SUMMARY OF THE INVENTION

The closer apparatus of this invention provides remote push button closing of the deck lid and automatic deck lid pull down initiated from any one or all three of the following remote positions;
1. glove box release button
2. keyless entry system on vehicle front door
3. dashboard control switch.

The system of this invention consists of three principal components, namely, a primary drive system (the lid closer), a moveable striker (the lid pull down unit) and a logic module. The primary drive mechanism consists of a motor, transmission, pulley and two cables. The cables are wound in opposite directions on a pulley assembly so that as one cable is retracted the other is extended. The moveable striker consists of a sliding member, cam, lever and cable driven by the primary drive mechanism. The logic module provides the logic circuitry and the position sensing switches of conventional construction to reverse the motor direction to change from a closing to a pull down mode. The reversing action can also occur when the module senses an obstruction during the closing mode.

The primary drive mechanism is located behind the hinge support for the deck lid in the trunk compartment. The two cables are routed from the primary drive mechanism, one cable attaching directly to the hinge and the other cable to the pull down unit located in the lower back panel of the trunk.

The primary drive mechanism is thus connected via one of the cables to the deck lid and operable when actuated to move the deck lid downwardly to a nearly closed position and the moveable striker is engageable with the lid latch in the nearly closed position of the deck lid and is operable, via the other cable, to pull the deck lid downwardly to the closed position. Thus, the apparatus is operable to automatically open and close the deck lid without interfering with manual opening and closing of the lid; the deck lid opening, once released, under the action of the usual biasing spring which is a conventional part of an automobile trunk compartment.

In a second embodiment of the invention, a worm gear drive is provided for the primary drive mechanism which is connected to the deck lid hinge not by a cable but by a rack and pinion connection so that the deck lid can not only be mechanically opened by the primary drive mechanism but can also be mechanically closed by the primary drive mechanism. In this embodiment of the invention, when the deck lid is manually opened, the ring gear in the worm gear drive mechanism will simply rotate in a reverse direction without significant resistance to opening of the deck lid. Thus, in both embodiments of the invention the apparatus of this invention does not interfere with manual opening and closing of the deck lid.

Thus, the apparatus of this invention provides improved structure for automatically opening and closing vehicle deck lids.

Further objects, features and advantages of the invention will become apparent from a consideration of the following description and the appended claims when taken in connection with the accompanying drawing in which;

Figure 1:
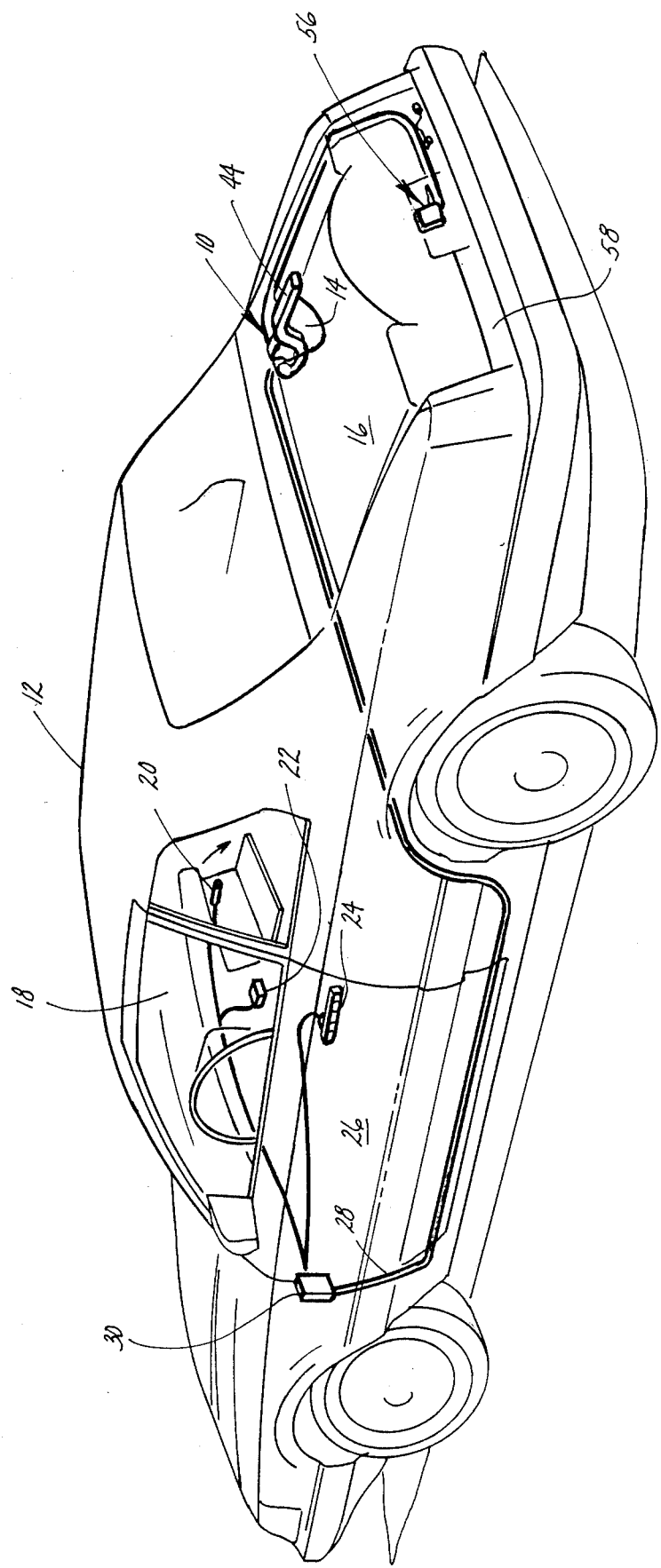
FIG. 1 is a perspective view of an automotive vehicle showing the apparatus of this invention in assembly relation therewith.

With reference to the drawing, the apparatus of this invention, indicated generally at 10, is shown in FIG. 1 in assembly relation with an automotive vehicle 12 having a trunk or storage compartment 14, normally closed by a deck lid 16, and a passenger compartment 18. The apparatus 10 is illustrated in FIG. 1 as being operable by any one of a glove box trunk release button 20, a dashboard mounted release button 22 or a conventional keyless entry type switch button 24 mounted on the vehicle front door 26. The actuator buttons 20, 22 and 24 are electrically connected by cable 28 to a logic module 30 and a reversible primary drive system electric motor, shown at 32 in FIG. 2. The motor 32 is mounted in the trunk compartment 14 behind the drive lid hinge assembly 34 and includes a two step pulley assembly 36 having a pair of cables 38 and 40 mounted thereon for a purpose to appear presently.

The hinge assembly 34 includes a support structure 42 having a hinge member 44 of irregular shape, pivotally mounted thereon by a hinge pin 46. A connector 48 on the end of the cable 38 is secured by a threaded member 50 to a bracket member 52 carried by the hinge member 44 at a position spaced from the hinge pin 46. As a result, when the primary drive motor 32 is operated to move the cable 38 in the direction of the arrow in FIG. 2 labeled "close", the hinge member 44 is pivoted in a clockwise direction as viewed in FIG. 2 to move it from its "lid open" position shown in FIG. 2 toward its "lid closed" position shown in FIG. 1.

Figure 2:
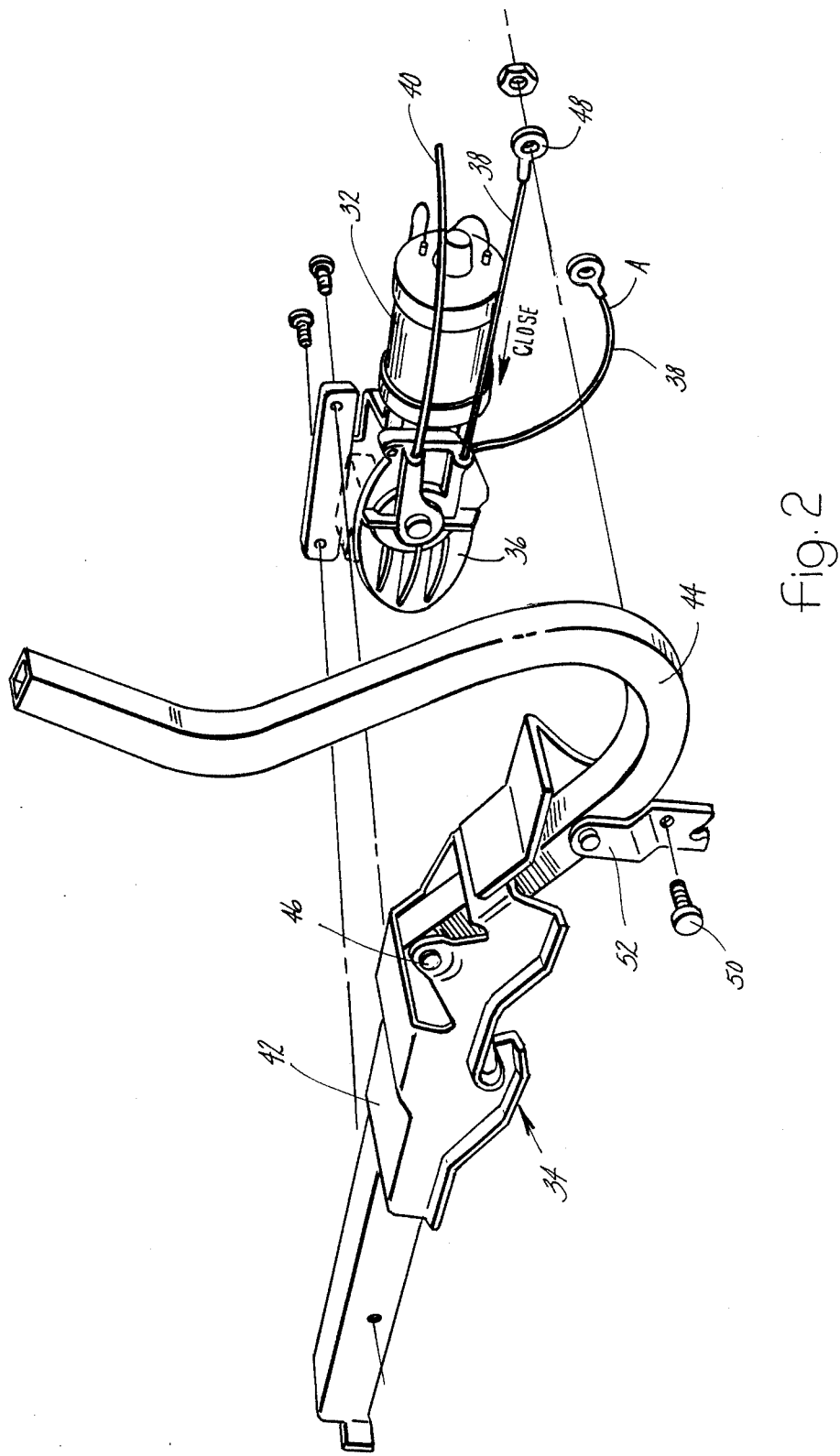
FIG. 2 is an exploded perspective view showing the primary drive mechanism in assembly relation with a deck lid hinge.

Conversely, when the cable 38 is moved in a direction opposite to the direction of the arrow in FIG. 2, the cable will go slack as indicated at A in FIG. 2 so that the conventional torsion spring (not shown) associated with the hinge 44 can move the deck lid 16 upwardly from the closed position shown in FIG. 1 to an open position without any restraining force by the cable 38.

Figure 3:
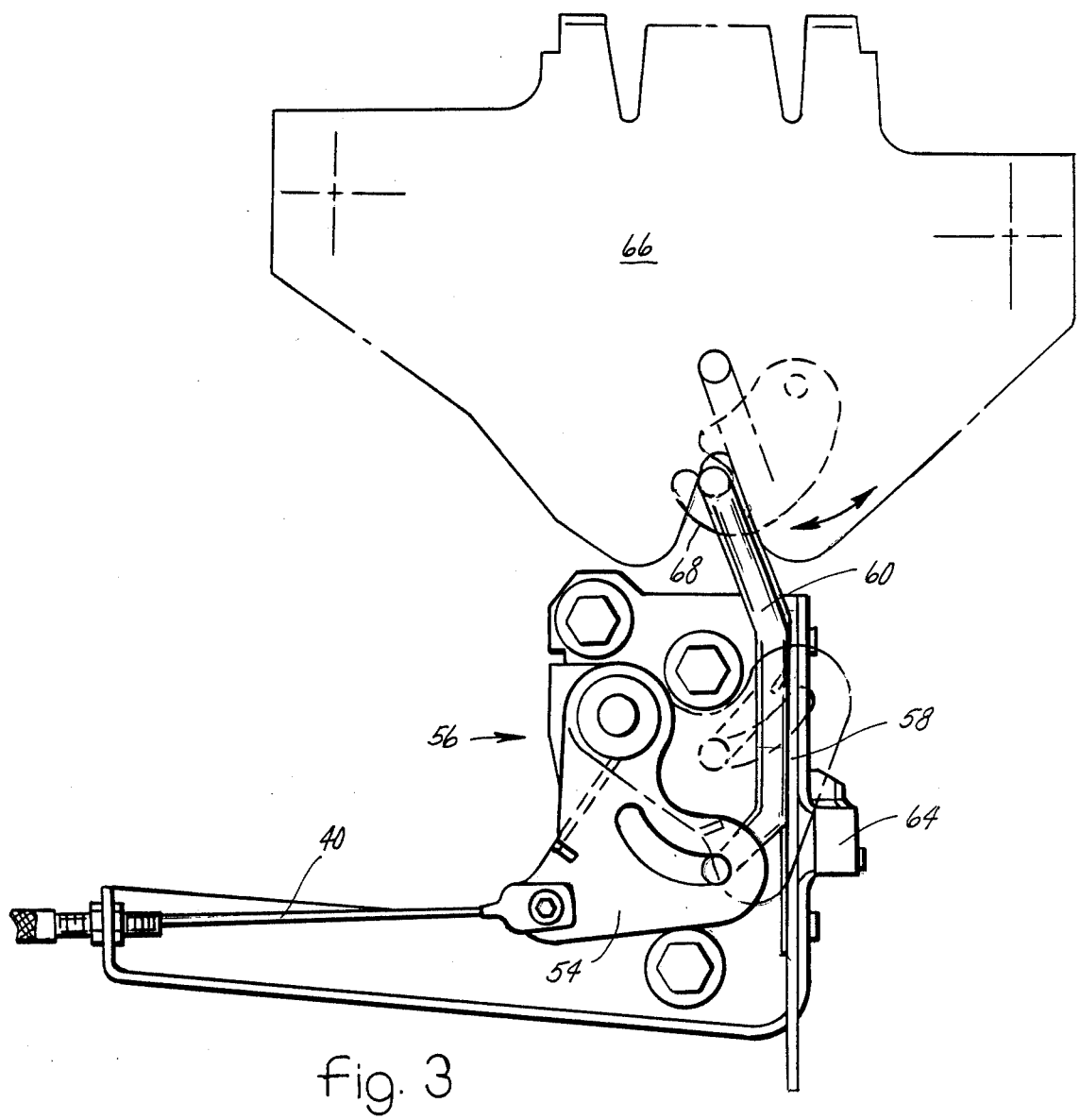
FIG. 3 is an elevational view of the moveable striker in the apparatus of this invention illustrated in assembly relation with the deck lid latch.
Figure 4:
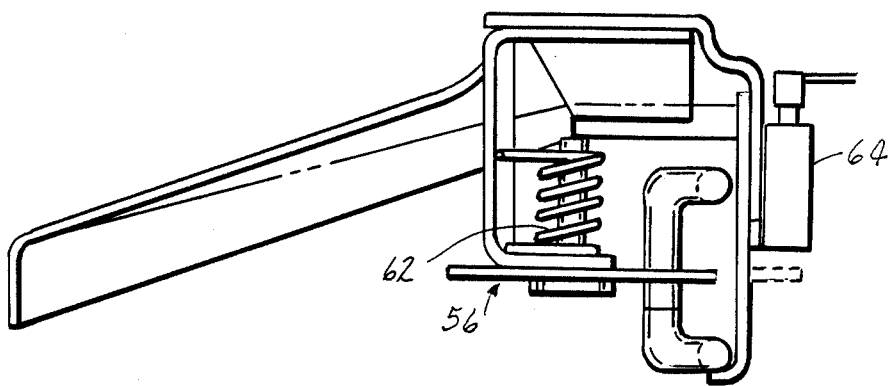
FIG. 4 is a top view of the mechanism shown in FIG. 3.
Figure 5:
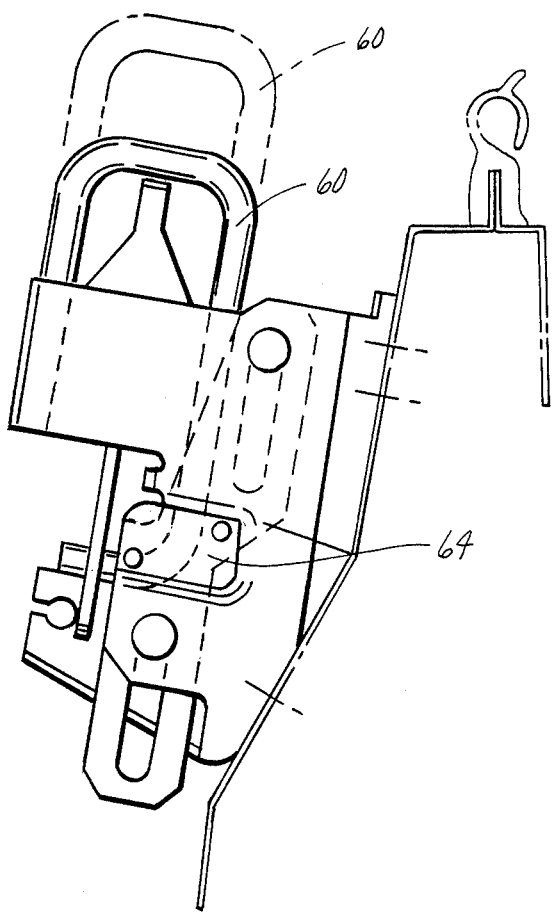
FIG. 5 is a side view of the apparatus shown in FIG. 3.

The second cable 40 (FIG. 3) is secured to a pivoted lever 54 in a moveable striker assembly 56 mounted on the lower back panel 58 of the vehicle 12. The assembly 56 includes a moveable striker member 60 of inverted U-shape moveable between the lower and upper positions illustrated in solid and broken lines, respectively, in FIG. 5. A coil spring 62 urges the striker 60 toward the upper position and a sensing switch 64 senses the location of the striker member 60 and is connected to the logic unit 30.

When the moveable striker 60 is in its upper position, it is engageable with a deck lid latch member 66 when the deck lid 16 is nearly closed. When so engaged, a locking cam 68 on the latch member 66 connects the latch 66 to the striker member 60. This location of the striker member 60 in latching engagement with the latch 66 is sensed by the switch 64 which results in the cable 40 acting to pull the striker member 60 downwardly from its upper position to its lower position for a purpose to appear presently.

In the operation of the apparatus 10 assume that the deck lid 16 is in its open position. One of the actuating buttons 20, 22 and 24 is actuated causing the motor 32 to move the cable 38 in the direction of the arrow shown in FIG. 2 to in turn move the hinge member 44 pivotally about the pin 46 in a direction to move the deck lid 16 downwardly to move the latch 66 toward the moveable striker 60. The striker 60 is now in its upper position because the cable 40 is relaxed or slack so that the spring 62 has moved the striker 60 to its upper position.

When the latch 66 engages the striker 60 the lid 16 is in its nearly closed position. The motor 32 is reversed in response to a signal initiated by the sensing switch 64. Reversal of the motor 32 results in the cable 38 going slack, as shown at A in FIG. 2, and be cable 40 exerting a pulling force on the lever 54 to in turn move the moveable striker member downwardly from its broken line position to its solid line position to in turn move the deck lid 16 from its nearly closed position to its closed position. The switch 64 senses this position of the deck lid 16 and turns off the motor 32.

The deck lid 16 will then remain in this position until either one of the actuating buttons on 20, 22 or 24 is actuated or the latch 66 is manually released from the striker 60 and the deck lid 16 is manually opened which is not in any way prevented by the apparatus 10.

When it is desired to move the deck lid 16 to its open position by remote actuation, one of the buttons 22, 24 or 26 is actuated to cause the motor 32 to operate so as to allow the cable 40 to go slack until the latch 66 has been released and the deck lid 16 automatically opened. At such time, the cable 38 is slack so that there is no restriction to opening movement of the deck lid 16 by the hinge 44.

Figure 6:
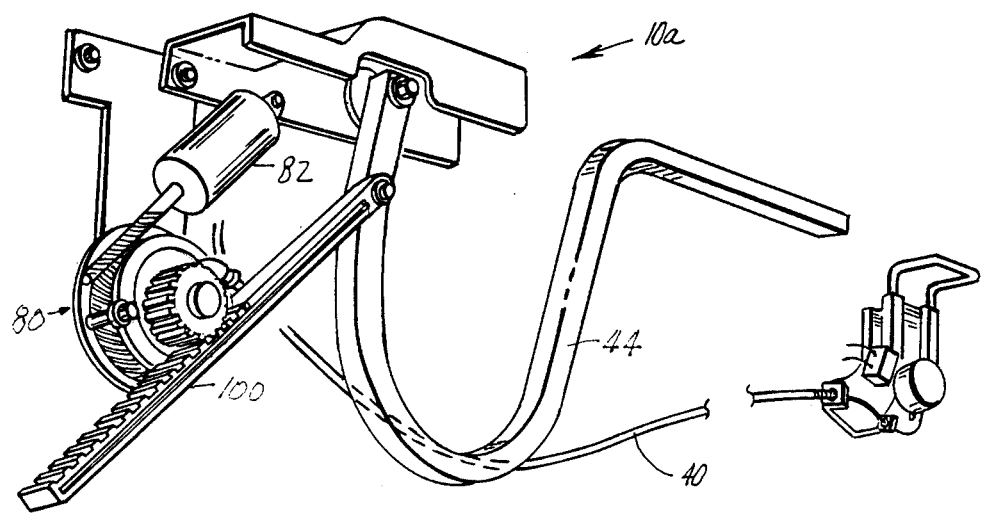
FIGS. 6 and 7 are perspective views of the primary drive mechanism and the deck lid hinge in a modified form of the apparatus of this invention, showing the hinge in the "deck lid closed" position in FIG. 6 and the "deck lid open" position in FIG. 7.
Figure 7:
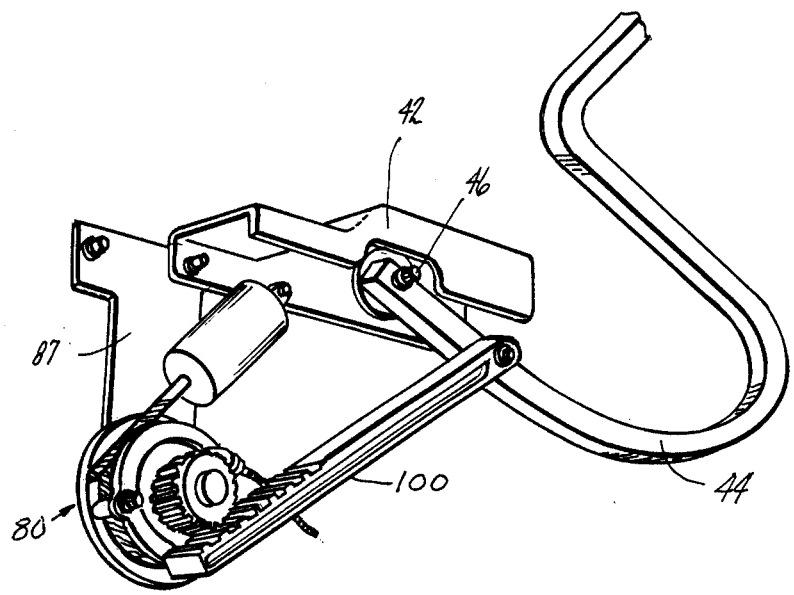
Figure 8:
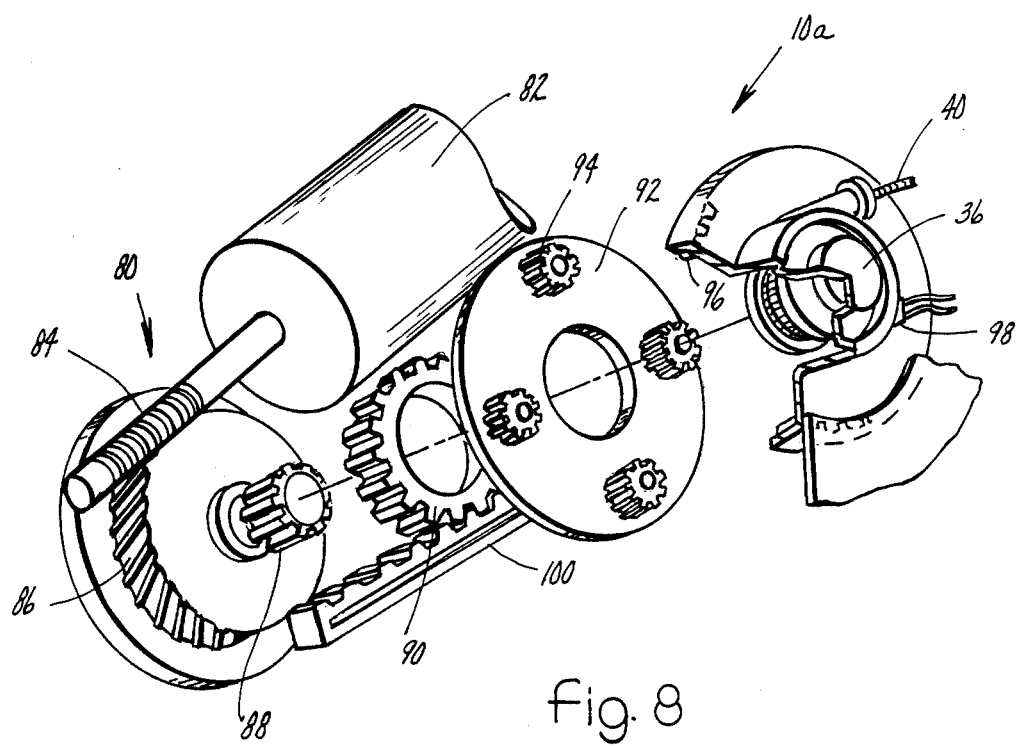
FIG. 8 is an exploded fragmentary perspective view of the worm gear drive in the modified form of the apparatus of this invention.

A modified form of the trunk lid closer is indicated at 10a in FIGS. 6, 7 and 8. The apparatus 10a is identical to the apparatus 10 previously described except that the primary drive system is modified so that the deck lid 16 can be power operated to open it as well as close it. The apparatus 10a includes a worm drive assembly 80 for powering the deck lid hinge 44 between its "lid closed" position shown in FIG. 6 and its "lid open" position shown in FIG. 7 and back again. The drive assembly 80 includes an electric motor 82 mounted on the frame 42 and driving a worm 84 which in turn drives a worm gear 86 mounted on a bracket 87 secured to the frame 42. The worm gear 86 is secured to a coaxial pinion gear 88 which drives a gear 90 secured to a planet carrier 92 which carries planet gears 94. The planet gears 94 drive a ring gear 96 which drives the pulley assembly 36 and is operatively associated with a switch 98 which is operable to cause the motor 82 to reverse. As shown in FIGS. 6, 7 and 8 the gear 90 meshes with a rack 100 which is pivotally connected to the hinge member 44. Suitable spring means (not shown) maintains the rack 100 in meshing engagement with the gear 90. In response to longitudinal movement of the rack 100, the hinge member 44 is moved between the "lid open" position shown in FIG. 7 and the "lid closed" position shown in FIG. 6.

In the operation of the apparatus 10a, assume that the lid 16 is in the trunk open position. One of the buttons 20, 22 or 24 is actuated to initiate operation of the motor 82 to rotate the worm 84 in a direction to move the rack 100 from its position shown in FIG. 7 to its position shown in FIG. 6 to move the deck lid 16 downwardly to its nearly closed position. When it reaches this position, the switch 98 is actuated to reverse the motor 82 and cause the cable 40 to move the moveable striker member downwardly from its upper position to its lower position to in turn move the deck lid 16 from its nearly closed position to its closed position. As soon as this is sensed by the switch 64, the logic module 30 operates to discontinue operation of the primary drive motor 82.

When it is desired to open the trunk lid 16 by actuation of a remote control button 20, 22, or 24, the drive motor is operated to rotate the worm gear 84 in a direction to move the hinge 44 from its position shown in FIG. 6 to its position shown in FIG. 7 and this movement is sensed by the switch 98 which operates through the logic module 30 to discontinue operation of the motor 82.

Whenever it is desired to manually open or close the deck lid 16 by means of the usual latch release key, the deck lid 16 can be moved and the ring gear 16 will simply rotate on the planets 94.

It can thus be seen that in both embodiments of the invention, the deck lid 16 can be automatically opened or closed and it can also be manually opened or closed without interfering with the automatic operation.

What is claimed is:

1. For use in an automotive vehicle having a deck lid for a storage compartment, wherein the deck lid is moveable between open and closed positions, and a latch on the deck lid is operable to latch the lid closed and release the lid for opening movement, apparatus for automatically opening and closing the lid without interfering with manual opening and closing of the lid, said apparatus comprising:

(a) a drive mechanism connected to said deck lid and operable when actuated to move said deck lid downwardly to a nearly closed position, (b) a moveable striker engageable with said latch in said nearly closed position of said deck lid and operable to pull said deck lid downwardly to said closed position, and means extending between said drive mechanism and said striker operable in response to reversing actuation of said drive mechanism to move said striker in a direction to move said deck lid downwardly.

2. Apparatus according to claim 1 wherein said drive mechanism includes driven pulley and cable means operable to alternately move said deck lid downwardly to a nearly closed position and move said striker in a direction to move said deck lid downwardly.

3. Apparatus according to claim 1 wherein said drive mechanism includes rack and pinion means operable to mechanically move said deck lid between said open and closed positions.

4. Apparatus according to claim 3 further including a driven worm, a worm gear driven by said worm, a planet carried, coacting gear means extending between said worm gear and said carrier providing for driving of said carrier by said worm gear, means providing for driving of said rack and pinion by said carrier, planet gears on said carrier, a ring gear driven by said planet gears, and means responsive to movement of said ring gear to a predetermined position corresponding to said nearly closed position of said deck lid providing for reversing of said drive mechanism to in turn provide for movement of said striker in a direction to move said deck lid downwardly to a fully closed position.

5. Apparatus according to claim 1 wherein said drive mechanism includes a reversible motor and pulley means drivable in opposite directions by said motor, a first cable on said pulley means and connected to said deck lid so that in response to rotation of said pulley means in one direction said first cable will pull said deck lid downwardly to said nearly closed position, a second cable on said pulley means and connected to said moveable striker so that in response to rotation of said pulley means in the opposite direction said second cable will move said striker in a direction to move said deck lid downwardly to a fully closed position.

6. Apparatus according to claim 5 wherein in response to rotation of said pulley means in said one direction said second cable will go slack and in response to rotation of said pulley means in said opposite direction said first cable will go slack.

7. Apparatus according to claim 5 further including sensing means operable in response to movement of said deck lid to said nearly closed position for causing said motor to reverse the direction of rotation of said pulley means.

* * * * *